(12) United States Patent
Wang

(10) Patent No.: US 7,092,986 B2
(45) Date of Patent: Aug. 15, 2006

(54) TRANSPARENT MOBILE IPV6 AGENT

(75) Inventor: Mei Na Wang, Taipei (TW)

(73) Assignee: Institute For Information Industry, Taipei (TW)

( * ) Notice: Subject to any disclaimer, the term of this patent is extended or adjusted under 35 U.S.C. 154(b) by 914 days.

(21) Appl. No.: 10/067,278

(22) Filed: Feb. 7, 2002

(65) Prior Publication Data

US 2003/0149719 A1    Aug. 7, 2003

(51) Int. Cl.
*G06F 15/16* (2006.01)
(52) U.S. Cl. ............... 709/202; 709/232; 709/230; 709/224
(58) Field of Classification Search ............... 709/202, 709/230, 232, 224
See application file for complete search history.

(56) References Cited

U.S. PATENT DOCUMENTS

2002/0194259 A1 * 12/2002 Flykt et al. ............... 709/202

FOREIGN PATENT DOCUMENTS

WO    WO 2004049668 A1 *    6/2004
WO    WO 2005025169 A1 *    3/2005

OTHER PUBLICATIONS

RFC 2290; Solomon et al.; pp. 1-15; Feb. 1998.*
RFC 2794; Calhoun et al.; pp. 1-8; Mar. 2000.*
Charles E. Perkins et al.; Mobility Support in IPv6; Proceedings of the 2nd Annual International Conference on Mobile Computing and Networking; pp. 27-37; Nov. 1996.*

* cited by examiner

*Primary Examiner*—Kenneth R. Coulter
(74) *Attorney, Agent, or Firm*—Bacon & Thomas, PLLC

(57) ABSTRACT

A transparent mobile IPv6 agent comprises a monitoring system for performing installation, parameter settings, and activation of related functions of different operating systems, and an application system having standard functions and standard data structures for internal processing, and having different interfaces designed for different operating systems. The interfaces of the application system comprises a socket service interface, an IPv6 layer interface, a network access layer API, and an operating system kernel layer interface.

6 Claims, 2 Drawing Sheets

TRANSPARENT MOBILE IPV6 AGENT

BACKGROUND OF THE INVENTION

1. Field of the Invention

The present invention relates to a mobile IP (Internet Protocol) agent and, more particularly, to a transparent mobile IPv6 agent being adapted to various operating systems and network connection devices.

2. Description of Related Art

Because the communication of Internet is getting popular, related protocols are continuously developed in recent years. For example, (1) a new Internet communication protocol IPv6 has been proposed in 1995 for solving the problems of lack of internet address in the existing IPv4 as well as increasing mobility, improving service quality of multimedia, and effectively supporting transmission security; (2) IP mobility support communication protocol (IPv4 version) (IETF RFC 2002 IP Mobility Support) was proposed in 1996 for enabling a mobile node to continue communication with other network nodes without changing the IP address and interrupting some applications even though the mobile node has changed the link points in link layer of the Internet; and (3) IP mobility support communication protocol (IPv6 version) draft has been updated to the 14th edition (i.e., draft-ietf-mobileip-ipv6-14.txt). Although the IP mobility support communication protocol (IPv6 version), as a basis for developing a mobile IPv6 agent system, is still in a drafting stage, the manufacturers and/or researchers have proposed a number of solutions to existing problems due to a strong requirement of the mobile communication. However, each solution has some drawbacks and difficulties in system integration as detailed below.

(1) A mobile IPv6 agent system developed in one operating system is not easy to transfer to another operating system because:

(1.1) Different operating systems have their distinct adapting interfaces for communicating with the network access layer and various access devices;

(1.2) Different operating systems have different implementations with respect to communication in nodes between various network layers in despite of having a standard socket linking mechanism between the nodes; and (1.3) Different operating systems have different designs in their kernel layers.

(2) It is not easy to integrate a mobile IPv6 agent system developed in one organization into the Internet layer communication system developed in another organization. This is because the interactive mechanisms of the mobile IPv6 agent system and the Internet layer communication system developed by different organizations are not the same.

(3) Mobile IPv6 agent systems developed from IPv6 mobility support communication protocol of different editions are implemented in different manners by various organizations. Therefore, a latter edition of mobile IPv6 agent system may not use the repeated portion of the former edition, so that the former and latter editions are not easily compatible.

Therefore, a novel transparent mobile IPv6 agent system is desirable. Such a system is modular to be adapted to different operating systems and network connection devices in order to mitigate and/or obviate the aforementioned problems.

SUMMARY OF THE INVENTION

An object of the present invention is to provide a transparent mobile IPv6 agent (TMIPA), which is adapted to various operating systems and network connection devices. By utilizing this, various mobile communication systems are capable of easily establishing mobile IPv6 agent systems in an open architecture, resulting in a quick information communication over the Internet.

To achieve the object, the transparent mobile IPv6 agent of the present invention comprises a monitoring system for performing installation, parameter settings, and activation of related functions for different operating systems, and an application system having standard functions and standard data structures for internal processing and having different interfaces designed for different operating systems. The interfaces of the application system comprising: (1) a socket service interface for generating a socket linking service in communication nodes of both entities through an IPv6 layer in processing mobile packets, wherein in response to a registration request from a mobile node, a binding acknowledgement packet is generated by the mobile agent and sent back to the mobile node; (2) an IPv6 layer interface for transmitting or receiving mobile packets through the IPv6 layer, wherein once the mobile agent IPv6 layer has received a binding update packet from a mobile node, the packet is transferred to TMIPA for registration; (3) a network access layer API (application program interface) for calling an API across different network access devices, for example, intercepting home mobile agent routing advertisement messages by mobile agent node to establish a list of home mobile agents; and (4) an operating system kernel layer interface for calling services related to procedures and data structures of the operating system, for example, calling an allocating registration cache memory capacity function to record information about all registered mobile nodes.

Other objects, advantages, and novel features of the invention will become more apparent from the detailed description when taken in conjunction with the accompanying drawings.

DETAILED DESCRIPTION OF THE PREFERRED EMBODIMENT

Figure 1:
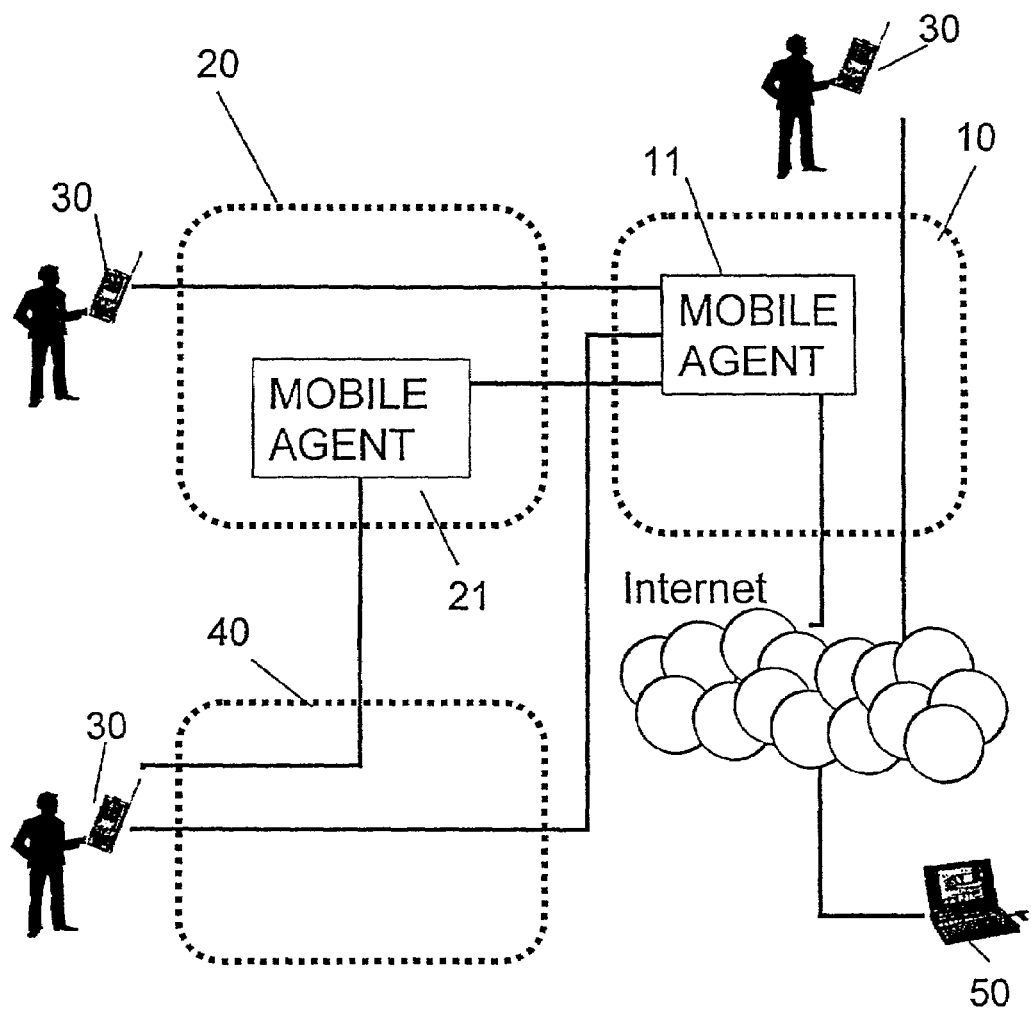
FIG. 1 schematically illustrates the operating flow modules for the transparent mobile IPv6 agent in accordance with the present invention.

With reference to FIG. 1, the operating flow modules for the transparent mobile IPv6 agent (TMIPA) in accordance with a preferred embodiment of the present invention are illustrated. As shown, a mobile agent 11 issues an agent advertisement to advertise its existence, and to establish a list of mobile agents $11_i$–$11_n$ in the home network 10. When a mobile node 30 finds that a mobile agent, that the mobile node 30 is previously registered in, has changed address and thus the connection therebetween is disabled, the mobile node 30 has to issue an agent location request to the home network 10 and receive an agent location response therefrom, so as to dynamically find the address of any new mobile agent $11_n$ address (dynamic agent address discovery).

When a mobile node 30 finds that it is in its home network 10, there is no need of mobility service. But if mobile node 30 moves from a foreign network 20 to its home network 10, it must issue a registration request to the home mobile agent 11 for de-registering its foreign registration.

When a mobile node 30 finds that it has moved to a foreign network 20, the mobile node 30 is provided with a care-of-address in the foreign network 20. A foreign mobile node 30 registers this care-of-address to the home mobile agent 11 by issuing a registration request (or known as a binding update) to the home mobile agent 11 and receiving a registration response (or known as a binding acknowledgement) therefrom.

The data packet sent from other correspondent nodes 50 to a moved mobile node 30 destined for its home address will be intercepted and encapsulated by the home mobile agent 11, and forwarded to the care-of-address of the mobile node 30. The home mobile agent 11 establishes a tunnel between the home address and care-of-address of the mobile node 30 for transmitting data packets. The other correspondent nodes 50 can continue their communication with the mobile node 30. If the mobile node 30 finds that it further moves to another foreign network 40, the mobile node 30 can register a new care-of-address in the foreign network 40 to the home mobile agent 11. Alternatively, if necessary, it is permitted to register the new care-of-address of the foreign network 40 to a transient mobile agent 21 in the foreign network 20. The transient mobile agent 21 will establish a tunnel between the old care-of-address of the foreign network 20 and the new care-of-address of the foreign network 40 for transmitting data packets.

Figure 2:
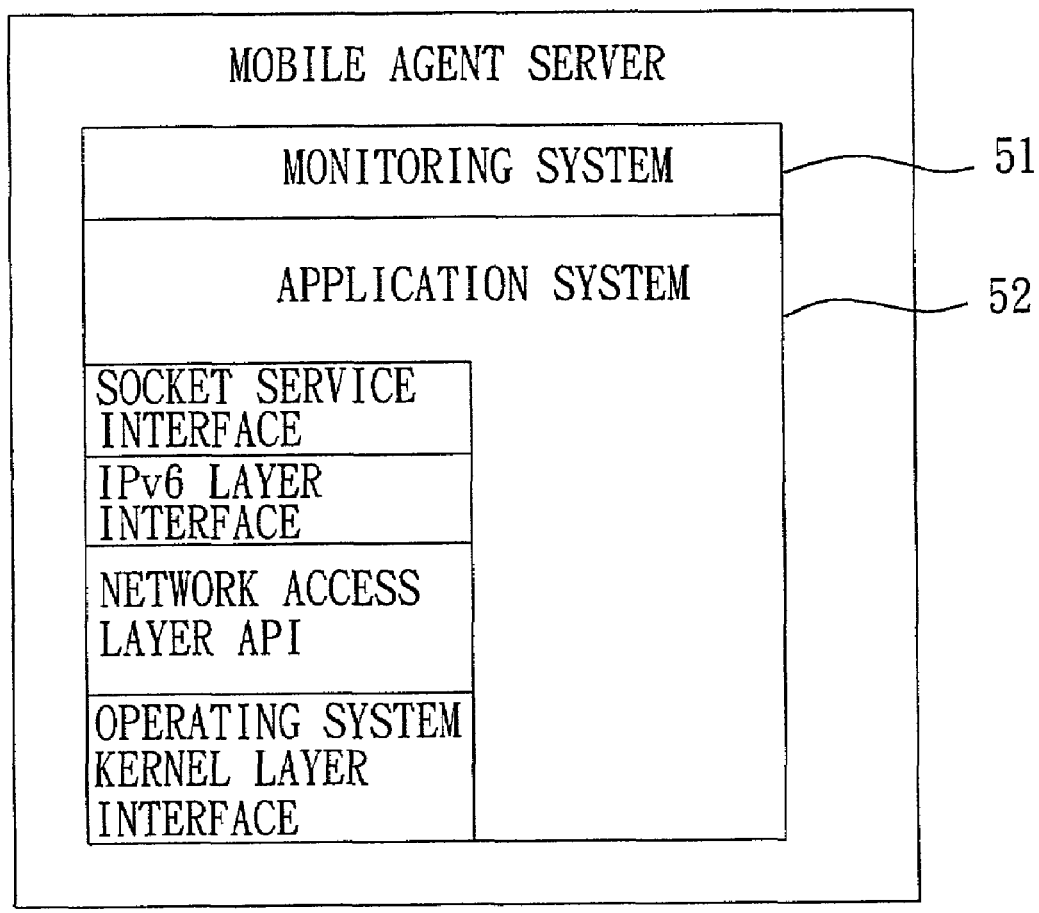
FIG. 2 schematically illustrates the transparent mobile IPv6 agent in accordance with the present invention.

With reference to FIG. 2, a structure of the transparent mobile IPv6 agent according to the present invention is illustrated. As shown, a monitoring system 51 and an application system 52 are provided in a mobile agent server. The monitoring system 51 is responsible for performing system operations including installation, parameter settings, and activation of related functions for different operating systems. The application system 52 has standard functions and standard data structures for internal processing, and has different interfaces designed for different operating systems. The internal calling interfaces of the application system 52 are the same. The differences of different operating systems are packaged in the external interfaces.

For achieving an establishment of communication protocol across platforms, the invention provides a communication mechanism capable of crossing the network access layer, the IPv6 layer, and the operating system kernel layer without departing from the existing mobile IPv6 communication protocol. As such, the present mobile IPv6 agent can be established on different platforms by simply modifying or adapting to different interfaces. In detail, in different operating systems, the communication nodes of both entities will establish a layer of interface coupled to the mobile IPv6 agent system on a socket linking service in processing mobile packets through the IPv6 layer. Moreover, for minimizing the change of communication system in the IPv6 layer for various organizations, a mechanism is established in the IPv6 layer for coupling to the mobile IPv6 agent system. In addition, for calling an API (Application Program Interface) of network access layer across operating systems, an interface is established on the API of network access layer for coupling to the mobile IPv6 agent system. As to the problem in that each operating system kernel layer may cause a portability problem, the mobile IPv6 agent system is operated by dividing the operating system kernel layer into independent files or functions, referring a function conversion table while calling, or adapting interfaces for converting formats.

Therefore, the established application system interface comprises the following related interfaces:
(1) Socket service interface: It is responsible for generating a socket linking service in communication nodes of both entities through IPv6 layer in processing mobile packets.
(2) IPv6 layer interface: It is responsible for transmitting or receiving mobile packets through the IPv6 layer.
(3) Network access layer API: It is responsible for calling an API related service across different network access devices.
(4) Operating system kernel layer interface: It is responsible for calling services related to procedures and data structure of operating system.

The packages of the monitoring system interface and application system interface refers to packaging the differences among various operating systems in external interfaces.

The package of monitoring system includes:
(1) Creating related compiled files corresponding to the compilation instructions of different systems;
(2) Creating related parameters/configuration setting file and file path of library corresponding to different system environments;
(3) Creating related system compilation, installation, and data file for activating related function;
(4) Performing related control, such as setting the parameters of HA Addr, MD5KEY, Routing Adv. (H bit on), Prefix Infor. (R bit on), MIN_ADV_INTERVAL, and MAX_ADV_INTERVAL.

As to the package of application system interface, there are included:
(1) Creating related application system header file;
(2) Creating related application system macro instruction file;
(3) Creating related application system function file;
(4) Creating reference tables regarding differences among various operating systems.
(5) Creating related application system initialization/clearing method; and
(6) Creating related application system installation information file.

In view of the foregoing, it is known that the invention first separates the portion of the mobile IPv6 agent system that interacts with each operating system, and then adds an adapting interface to increase the portability of software. As a result, the mobile IPv6 agent system can be easily transferred to different platforms. Moreover the operating process is modularized to be adapted to adapt to an adjustment of the communication protocol.

Although the present invention has been explained in relation to its preferred embodiment, it is to be understood that many other possible modifications and variations can be made without departing from the spirit and scope of the invention as hereinafter claimed.

What is claimed is:

1. A transparent mobile IPv6 agent, embodied on a computer readable storage medium, comprising:
   a monitoring system for performing system operations including installation, parameter settings, and activation of related functions for different operating systems; and
   an application system having standard functions and standard data structures for internal processing, and having different interfaces for different operating systems, the interfaces of the application system comprising:

a socket service interface for generating a socket linking service in communication nodes of both entities through an IPv6 layer in processing mobile packets;

an IPv6 layer interface for transmitting or receiving mobile packets through the IPv6 layer;

a network access layer API for calling an API related service across different network access devices; and an operating system kernel layer interface for calling services related to procedures and data structures of an operating system.

2. The transparent mobile IPv6 agent as claimed in claim 1, wherein the application system has same internal calling interfaces, and differences of different operating systems are packaged in external interfaces.

3. The transparent mobile IPv6 agent as claimed in claim 2, wherein a package of the application system comprises:
creating related application system header file;
creating related application system macro instruction file;
creating related application system function file;
creating related application system initialization/clearing method; and
creating related application system installation information file.

4. The transparent mobile IPv6 agent as claimed in claim 3, wherein each of the application system's header file, macro instruction file, function file, initialization/clearing method, and installation information file has a reference table regarding differences among various operating systems.

5. The transparent mobile IPv6 agent as claimed in claim 4, wherein the monitoring system packages the differences in external interfaces.

6. The transparent mobile IPv6 agent as claimed in claim 5, wherein a package of the monitoring system comprises:
creating related compiled files corresponding to compilation instructions of different systems;
creating related parameters/configuration setting file and file path of library corresponding to different system environments;
creating related system compilation, installation, and data file for activating related function; and
setting related control parameters.

* * * * *